United States Patent
Anderten et al.

(10) Patent No.: US 7,607,669 B2
(45) Date of Patent: Oct. 27, 2009

(54) SPLIT ELECTROMECHANICAL MOTOR VEHICLE STABILIZER HAVING A LOCKING DEVICE, AND METHOD FOR ROLL STABILIZATION IN THE EVENT OF FAILURE OR SHUTOFF OF THE ACTIVE MOTOR VEHICLE STABILIZER

(75) Inventors: Timo Anderten, Munich (DE); Thomas Meitinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/859,344

(22) Filed: Sep. 21, 2007

(65) Prior Publication Data
US 2008/0007023 A1 Jan. 10, 2008

Related U.S. Application Data

(63) Continuation of application No. PCT/EP2006/003230, filed on Apr. 8, 2006.

(30) Foreign Application Priority Data
May 11, 2005 (DE) .................. 10 2005 021 673

(51) Int. Cl.
*B60G 21/055* (2006.01)

(52) U.S. Cl. ............................ 280/124.107; 280/5.501; 280/5.509; 280/124.106

(58) Field of Classification Search .......... 280/124.107, 280/124.101, 124.102, 5.502, 124.106, 124.149, 280/124.137, 124.152, 124.166, 124.167, 280/5.501, 5.511, 5.508, 5.509
See application file for complete search history.

(56) References Cited

U.S. PATENT DOCUMENTS

| | | | |
|---|---|---|---|
| 4,648,620 A * | 3/1987 | Nuss | ................. 280/5.511 |
| 6,481,732 B1 | 11/2002 | Hawkins et al. | |
| 7,100,926 B2 | 9/2006 | Osterlanger et al. | |
| 7,124,863 B2 | 10/2006 | Munster | |
| 2005/0023789 A1 | 2/2005 | Suzuki et al. | |

FOREIGN PATENT DOCUMENTS

DE   198 46 275 A1   12/1999

(Continued)

OTHER PUBLICATIONS

German Search Report dated Mar. 28, 2006 with English Translation of the relevant portion (Nine (9) pages).

*Primary Examiner*—Eric Culbreth
(74) *Attorney, Agent, or Firm*—Crowell & Moring LLP

(57) ABSTRACT

A split electromechanical motor vehicle stabilizer having a locking device, and a method for roll stabilization are described. A split motor vehicle stabilizer is provided for roll stabilization, having a built-in electromechanical actuator for bracing two stabilizer parts against one another, including at least an electric motor, a gear unit, and a locking device which can lock a housing for the actuator to a rotor in the electric motor. The housing is connected to one of the stabilizer parts, and a gear unit output shaft is connected to the other stabilizer part for the purpose of transmitting torque. The housing and the rotor can be locked in only one position relative to one another after the locking device is activated, and that is the normal position for the two halves of the stabilizer in which they are not braced against one another.

15 Claims, 4 Drawing Sheets

FOREIGN PATENT DOCUMENTS

| | | |
|---|---|---|
| DE | 100 37 486 A1 | 2/2002 |
| DE | 101 51 261 A1 | 4/2003 |
| DE | 103 57 853 A1 | 7/2005 |
| EP | 1 157 865 A2 | 11/2001 |
| EP | 1 236 592 A2 | 9/2002 |
| EP | 1 426 208 A1 | 6/2004 |
| EP | 1 491 371 A1 | 12/2004 |
| JP | 60-26821 A | 2/1985 |
| WO | WO 03/009445 A2 | 1/2003 |
| WO | WO 03/045719 A1 | 6/2003 |
| WO | WO 2004/010555 A2 | 1/2004 |
| WO | WO 2004/037573 A1 | 5/2004 |

\* cited by examiner

SPLIT ELECTROMECHANICAL MOTOR VEHICLE STABILIZER HAVING A LOCKING DEVICE, AND METHOD FOR ROLL STABILIZATION IN THE EVENT OF FAILURE OR SHUTOFF OF THE ACTIVE MOTOR VEHICLE STABILIZER

CROSS REFERENCE TO RELATED APPLICATIONS

This application is a continuation of PCT International Application No. PCT/EP2006/003230, filed Apr. 8, 2006, which claims priority under 35 U.S.C. § 119 to German Patent Application No. 10 2005 021 673.0, filed May 11, 2005, the entire disclosures of which are herein expressly incorporated by reference.

BACKGROUND AND SUMMARY OF THE INVENTION

The invention relates to a split electromechanical motor vehicle stabilizer having a locking device, and a method for roll stabilization of the vehicle which include a built in electromechanical actuator for bracing two stabilizer parts against one another.

It is known to divide a motor vehicle stabilizer into a first stabilizer part associated with the suspension of the left wheel on a vehicle axle, and a second stabilizer part associated with the suspension of the right wheel on this vehicle axle. When these stabilizer parts are mutually rotatable about their common longitudinal axis, a greatly increased roll support may be achieved compared to chassis having conventional stabilizers when the two stabilizer parts are rotated with respect to one another, as necessary, by suitable actuation provided by an actuator provided therebetween.

An electromechanical actuator that is suitable for this application comprises an electric motor and a mechanical gear unit. A stabilizer is thus obtained, the two stabilizer halves of which may be rotated with respect to one another in a targeted manner by the electromechanical actuator, thereby producing a desired stabilizer torque which then prevents roll of the vehicle bodywork.

German Patent Document DE 198 46 275 A1 describes such a split stabilizer having a built-in electric oscillating motor for roll control. By using the stabilizer parts designed as passive torsion springs, this split stabilizer is able to transmit pretensioning and thus a stabilization torque into the vehicle bodywork which counteracts a roll motion.

To allow pretensioning of the stabilizer parts for roll control, the oscillating motor must actively apply a defined torque, and thus be able to set a given angle of rotation between the two stabilizer parts. The magnitude of the torque to be applied must be selected in accordance with the magnitude of the roll motion.

If the roll control fails, for example due to an interruption in the power supply or malfunction of a system component, the actuator is no longer able to actively provide the necessary torque, which in the absence of further measures results in loss of activity of the two stabilizer parts, since the rotor and stator of the electric motor may be easily rotated with respect to one another.

To prevent this undesired rotation, the oscillating motor in German Patent Document DE 198 46 275 A1 has a brake which acts as a locking device between the two stabilizer parts in the event of a malfunction in the system. The stabilizer parts then act as a passive stabilizer which permits a roll angle that deviates from the roll angle in the actively stabilized state, but still allows travel to continue.

During cornering, however, if a transition from active roll control to passive roll stabilization occurs due to use of the brake, and the oscillating motor is locked, but the oscillating motor has pretensioned the stabilizer parts against one another, the vehicle continues traveling with the vehicle bodywork rotated about the longitudinal axis of the vehicle when cornering is completed.

The embodiments of the invention provide a split electromechanical motor vehicle stabilizer for roll stabilization and a method for roll stabilization for a motor vehicle in which these disadvantages do not occur during use of a locking device, and which in the event of failure of the roll control allows a mechanically functioning emergency operation of the stabilizer, which is employed as a function of the position on the input side over several rotations of the actuator, and which need only absorb the lower gear unit input load, not the high load on the output side.

According to an exemplary embodiment of the invention, a split motor vehicle stabilizer is provided for roll stabilization, having a built-in electromechanical actuator for bracing two stabilizer parts against one another, which includes at least an electric motor, a gear unit, and a locking device which can lock a housing for the actuator to a rotor in the electric motor, the housing being connected to one of the stabilizer parts, and a gear unit output shaft being connected to the other stabilizer part for the purpose of transmitting torque. The housing and the rotor can be locked relative to one another in only one position, for example the locking position, after the locking device is activated, and the locking position is the normal position for the two halves of the stabilizer in which they are not pretensioned against one another.

This embodiment provies the advantage that when the roll control shuts off or fails, the rotational motion of the two stabilizer parts relative to one another can be locked in only one position, which corresponds for example to the position on level ground with the wheels facing straight ahead. This advantageously ensures that at the end of a cornering maneuver, the vehicle does not have to continue travel with a vehicle bodywork rotated about the longitudinal axis of the vehicle if the roll control fails during the cornering. This is because, as a result of the pretensioning of the bodywork springs, the vehicle bodywork can resume a horizontal position before locking is initiated.

A fully mechanical, form-fit lock is still possible, however, as fail-safe protection in an exemplary gear unit which can be operated in oscillating mode with limitation of absolute revolutions, in order to allow the failure mode to be initiated in a defined horizontal position of the vehicle bodywork. A form-fit connection of the gear unit input shaft and the housing is advantageously established in the case of failure mode operation, the exemplary connection being made as a function of the position. The information concerning the location of the defined position of the mechanical locking is provided in this example by superimposing multiple, in this case two, mechanical position indicators.

In one exemplary preferred embodiment of the invention, the locking device includes a movable locking bar which is fixed to the housing, i.e., the rotor, so as to be displaceable in the axial position, and which by being moved into the locking position establishes a form-fit connection, having a locking effect in the circumferential direction, with at least one recess in the rotor, i.e., the housing. This advantageously ensures a particularly simple design of the locking device.

Alternatively, the exemplary locking device may also include a movable locking bar which is fixed to the housing or to the gear unit output shaft so as to be displaceable in the axial position, and which by being moved into the locking position establishes a form-fit connection, having a locking effect in the circumferential direction, with at least one recess in the gear unit output shaft or in the housing.

In one exemplary embodiment, the locking device may include an electromagnet which holds the locking bar against the pretensioning force of a spring in a nonlocking position, or in a locking position. As an alternative in the design of the locking device, a choice may be made as to whether the locking device will be used with or without the supply of current in the failure state.

In one preferred exemplary embodiment of the invention, the locking device includes a locking bar having at least three form-fit profiles: a first profile whose counter-profile is provided on the gear unit output shaft, a second profile whose counter-profile is provided on the rotor, and a third profile whose counter-profile is provided on the housing.

In one simple, particularly preferred exemplary embodiment of the invention, one of the three form-fit profiles is always engaged with its counter-profile for the purpose of fixing the locking bar in the circumferential direction and for axial guiding thereof. In addition, the other two form-fit profiles are engaged with their counter-profiles only when the locking device fixes the two stabilizer parts in the locking position.

One particularly advantageous exemplary method for roll control on a front and/or rear axle of a motor vehicle by using a split stabilizer, in which an electromechanical actuator compensates for roll motions of the vehicle bodywork with respect to the chassis by bracing the two stabilizer parts against one another in both rotational directions of the electromechanical actuator, in such a way that the vehicle bodywork maintains a substantially parallel horizontal plane. In this exemplary embodiment, following shutoff or in the event of failure of the electromechanical actuator, roll motions of the vehicle bodywork with respect to the chassis are influenced by the fact that the two stabilizer parts are connected to one another by a locking device in their normal position, namely the locking position. If an electromechanical actuator is provided on both the front and rear axles, the driving stability may be increased by locking only the stabilizer parts on the front axle, since undercontrol of the handling characteristics is achieved. In cases when this is the sole desired influence on the handling characteristics, the motor vehicle may also be equipped with split stabilizers in which only the actuator for the front axle is provided with a locking device.

Other objects, advantages and novel features of the present invention will become apparent from the following detailed description of the invention when considered in conjunction with the accompanying drawings.

BRIEF DESCRIPTION OF THE DRAWINGS

Two preferred exemplary embodiments of the invention are illustrated in the following description and the associated drawings, which show the following.

DETAILED DESCRIPTION OF THE DRAWINGS

Figure 1:
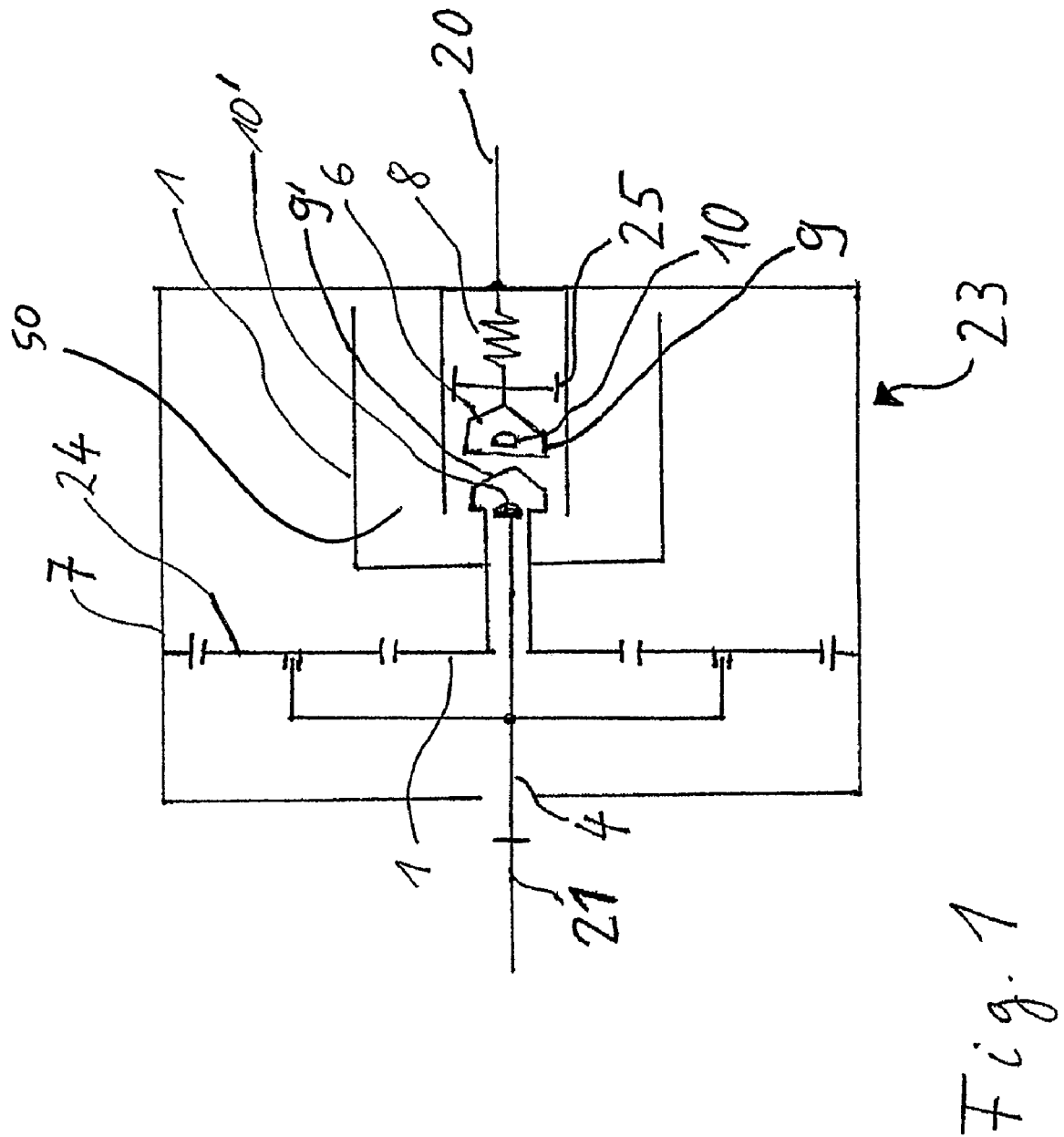
FIG. 1: shows a partial schematic illustration relating to the operating principle of an electromechanical actuator according to the invention, for an active motor vehicle stabilizer.

FIG. 1 shows an exemplary active stabilizer, of which only the ends of two stabilizer parts 20, 21 are illustrated, which are connected to one another via an electromechanical actuator 23 and which may be pretensioned against one another. In this exemplary embodiment, the actuator includes an electric motor, not illustrated, as a device for producing torque, and a mechanical gear unit 24 as a device for transmitting torque to the stabilizer parts 20, 21. In this example, the selected gear transmission ratio of the gear unit 24 is constant. The actuator 23 may have a housing 7 which is connected to the stabilizer part 20. The stator of the electric motor may be attached in the housing 7, and during operation of the electric motor the stator transmits torque via its rotor 1 to the mechanical gear unit 24. The torque is further transmitted to the stabilizer part 21, thus bracing the two stabilizer parts 20, 21 against one another. Segments of the stabilizer parts 20, 21 are shown in the figure which indicate that in the vicinity of the attachment point the stabilizer parts 20, 21 are coaxially positioned with respect to the actuator 23. Torque is transmitted to the stabilizer parts 20, 21, for example, via suitable shaft-hub connections (not shown).

Conventional fastening elements (not illustrated) may be provided on the motor vehicle (not illustrated), and for each stabilizer part 20, 21 a respective support bearing is provided, and on the ends of the stabilizer parts (not shown) a force transmission device is provided for the wheel suspension (not shown).

The dynamics of the overall exemplary system are primarily influenced by the gear transmission ratio, the mass inertia of the system, the electric motor, and the torsional rigidity of the two stabilizer parts 20, 21.

According to an embodiment of the invention, by virtue of being supplied with current, the electric motor is able to brace the stabilizer parts 20, 21 against one another for purposes of roll control. A conventional controllable, reversible electric motor may be used so that the stabilizer parts 20, 21 may be braced against one another in both rotational directions with varying torque.

Locking of the two stabilizer parts 20, 21 with respect to one another typically occurs after the roll control shuts off or fails. At that time, roll motions of the vehicle bodywork with respect to the chassis are influenced by the fact that the two stabilizer parts 20, 21 twist without the actuator 23 for the roll control compensating for the roll motions. Thus, even if the roll control shuts off or fails, roll stabilization may still be achieved during cornering, thereby reducing the roll angle. A cornering maneuver which is stable with respect to yaw is achieved when the actuator on the front axis is locked and the actuator on the rear axis is not locked.

An exemplary locking device allows the two stabilizer parts 20, 21, which are situated only in one given position with respect to one another, to be mechanically connected in the locking position, so that before the locking device engages, the vehicle bodywork, for example after failure of the roll control during a cornering maneuver, is first aligned in the normal position of the two stabilizer parts 20, 21 in which the stabilizer parts are not pretensioned against one another, as soon as the vehicle resumes straight-ahead travel. Only then does the locking device cause the housing 7 for the actuator 23 to be fixed to the rotor 1 of the electric motor, whereby the housing 7 is connected to one stabilizer part 20, and a gear unit output shaft 4 is connected to the other stabilizer part 21 for the purpose of transmitting torque.

The locking device according to this embodiment includes a displaceable locking bar 6 which is fixed to the housing 7 via a spline 25 which is always engaged, so as to be stationary in the circumferential direction and movable in the axial direction, and which, as the result of being displaced into the locking position, establishes a locking form-fit connection with the rotor 1. For purposes of roll control, an electromagnet 5 (FIG. 2) supplied with current may be used to hold the locking bar 6 against the pretensioning force of a spring 8 in the nonlocking position. If the roll control fails, the current supply to the electromagnet 5 ceases, and for establishing the form-fit connection with the rotor 1 the spring 8 then pushes the locking bar 6 when a first form-fit profile 10 on the locking bar 6, whose counter-profile 10' is provided on the gear unit output shaft 4, and a second form-fit profile 9 on the locking bar 6, whose counter-profile 9' is provided on the rotor 1, are able to engage with the respective counter-profile 10', 9'. This occurs, in this exemplary embodiment, when the two stabilizer parts 20, 21 are in the locking position, i.e., in their normal position in which they are not braced against one another, and the vehicle bodywork is thus kept parallel to a horizontal plane.

The exemplary locking device according to this embodiment may be implemented very easily by using a mechanical gear unit 24, such as a planetary gearing, in which the gear unit input shaft, which in this case corresponds to the rotor 1, and the gear unit output shaft 4 are coaxial. However, this principle may be utilized with a countershaft transmissions as well.

In a normal operating mode according to this embodiment, i.e., when roll control is in operation, the locking bar 6 is held by the electromagnet 5, composed of a coil 5a and a solenoid plunger 5b (FIG. 2), in the position which enables the actuator 23. In the event of a power failure, the locking bar 6 together with the first form-fit profile 10 and the second form-fit profile 9 are pressed against their respective counter-profiles 10' on the gear unit output shaft 4 and 9' on the rotor 1, via the spring 8. The gear unit 24 is not locked via the form-fit connection of the profiles 9, 9' until both counter-profiles 9', 10' are able to engage with the form-fit profiles 9, 10. The necessary locking torque is correspondingly reduced via the gear transmission ratio. The counter-profile 10', which acts as a position indicator for the gear unit output shaft 4, is guided via an extension through the gear unit input shaft, the rotor 1, which may be formed as a hollow shaft, and fastened to the gear unit output shaft 4. Since no torque transmission occurs at this location, the extension may have a correspondingly thin design and the counter-profile 10' may likewise have small dimensions, so that recurring matching with the form-fit profile 10 may be achieved at this location at every 360 degrees of rotation.

Figure 2:
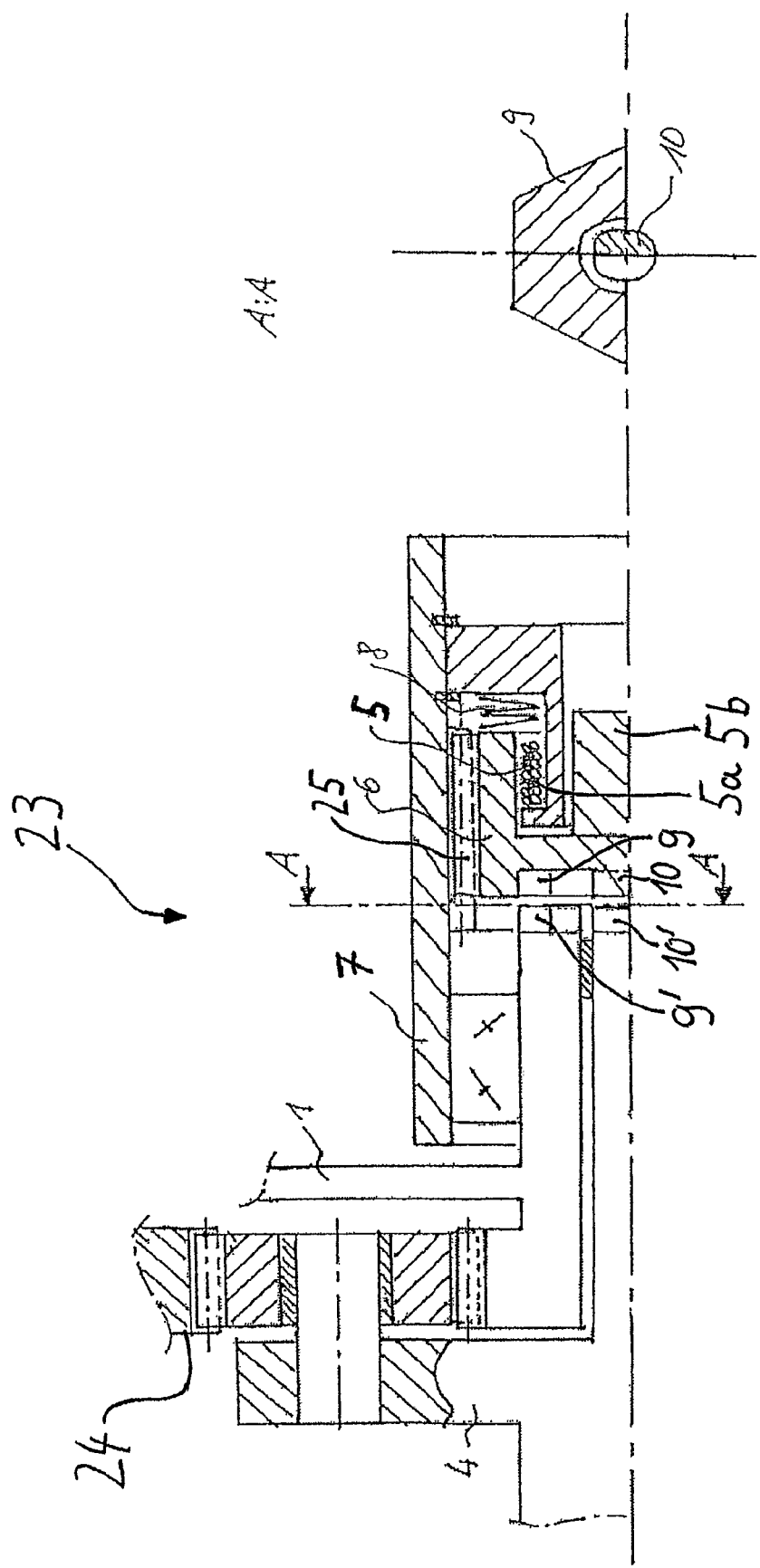
FIG. 2: shows the electromechanical actuator according to FIG. 1 in a partially illustrated longitudinal and transverse section.
Figure 3:
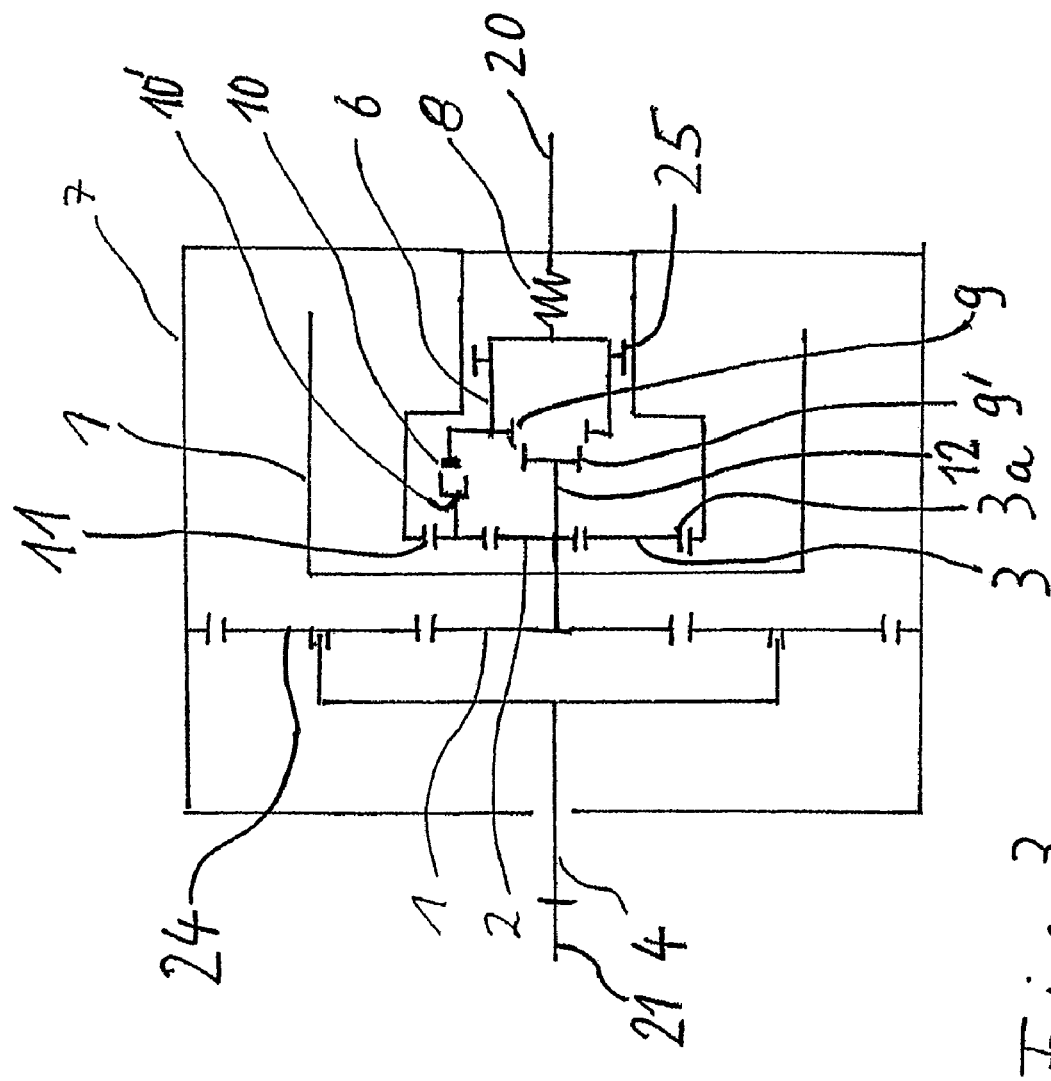
FIG. 3: shows a further embodiment of an electromechanical actuator according to the invention, in a partial schematic illustration relating to the operating principle, for an active motor vehicle stabilizer.
Figure 4:
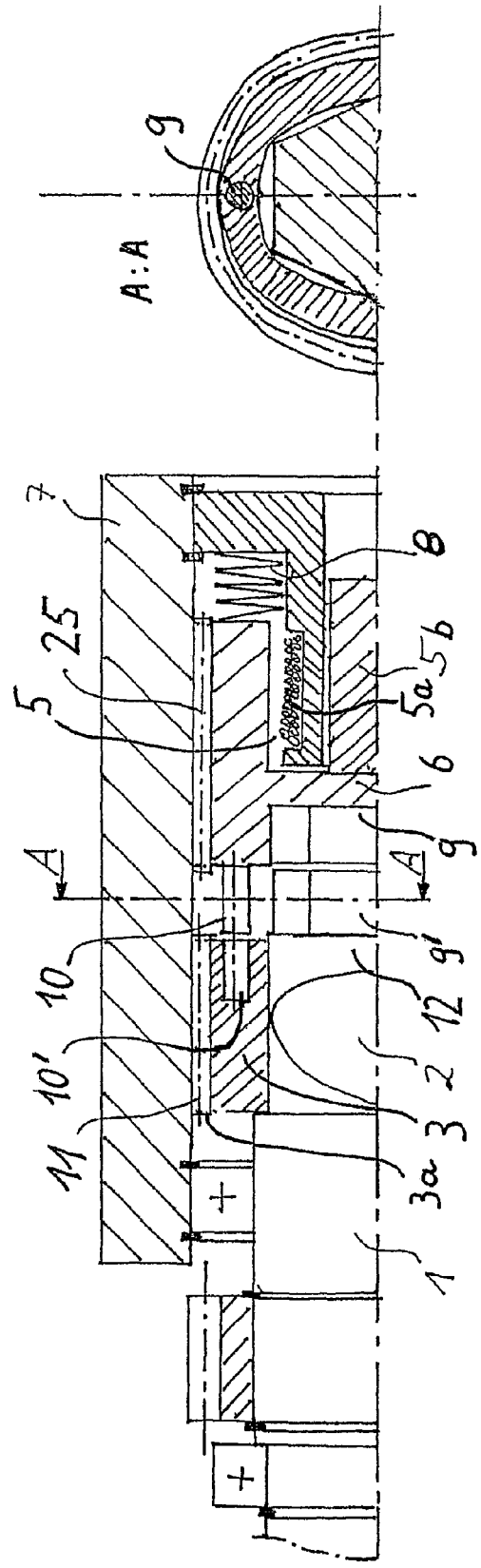
FIG. 4: shows the electromechanical actuator according to FIG. 3 in a partially illustrated longitudinal and transverse section.

The exemplary cross section in FIG. 2 shows a semicircular depression in the form-fit profile 10. In contrast, for the torque-transmitting form-fit profile 9 the contour is designed to match the load force. A hexagonal shape may be used for the form-fit profile 9. This results in a match with the counter-profile 9' every 60 degrees. The gear transmission ratio of the exemplary mechanical gear unit 24 is therefore selected such that two locking positions of the form-fit profiles 9, 10, in engagement with the counter-profiles 9', 10' do not repeat until after a large number of revolutions. The following equation describes the number of revolutions after which a repeated locking is possible. For an odd-numbered transmission i, the angle which results in a repeated match of both form-fit profiles 9, 10 with their counter-profiles 9', 10' may be increased, within the allowable error tolerance due to elastic deformation and gear unit play, which could also result in locking despite a difference of several degrees.

$$\frac{\varphi_{an}}{i} \frac{1}{\Phi_{ab}} \in Z \frac{\varphi_{an}}{\Phi_{an}} \in Z$$

where $\phi_{an}$: Angle of rotation of the rotor or gear unit input shaft
$\Phi_{an}$: Locking angle on the input side
$\Phi_{ab}$: Locking angle on the output side
i: Gear unit transmission ratio
$\in Z$: Integer FIGS. 3 and 4 show a different exemplary embodiment of a device for fixing the locking position, instead of a form-fit profile with a corresponding counter-profile, a harmonic drive gear unit is used. In other respects, identical parts are denoted by the same reference numerals corresponding to the exemplary embodiment of FIGS. 1 and 2.

The exemplary gear unit input shaft, i.e., the rotor 1, may have an elliptical section 2 on which a flexible annular gear 3 revolves, i.e., slides, and which is deformed corresponding to the elliptical shape of the shaft. This annular gear 3 has outer teething 3a which engage with inner teething 11, the ring gear, for the stationary housing 7. The operation of this exemplary gear pair is based on the harmonic drive principle, whereby a small gear difference results in a high gear ratio between the gear unit input shaft and the annular gear 3. The annular gear 3 may have a borehole as a counter-profile 10', in which the locking device with its form-fit profile 10 engages at a defined position. In the operating mode, the locking bar 6 is restrained by an electromagnet 5 supplied with current (FIG. 4), composed of a coil 5a and a solenoid plunger 5b, against the restoring force of the spring 8. Upon failure of the roll control, the locking bar 6 together with the form-fit profile 10 is pressed against the annular gear 3, thus allowing the locking bar to engage in the position defined by the counter-profile 10' by displacement into the locking position. In this case, the torque-transmitting form-fit profile 9 for the locking bar 6 simultaneously engages with its counter-profile 9', fixed to the rotor, on the annular gear 3, and establishes the form-fit connection. This produces locking in the circumferential direction, between the end 12 of the gear unit input shaft and the locking bar 6, i.e., between the housing 7 and the rotor 1. The torque for locking the gear unit input shaft, i.e., the rotor 1, may be transmitted via a spline 25, in which the locking bar 6 may be axially displaced, to the housing 7. As a result of the high gear ratio of the harmonic drive gear unit, the exemplary gear unit 24 may be locked in a desired position over a large angular range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A split motor vehicle stabilizer for roll stabilization, comprising:
   a built-in electromechanical actuator for bracing two stabilizer parts against one another;
   an electric motor;
   a gear unit;

a locking device for locking a housing of the actuator to a rotor of the electric motor, the housing being connected to one of the stabilizer parts, and a gear unit output shaft being connected to another of the stabilizer parts for transmitting torque, wherein the housing and the rotor are lockable in only one locking position relative to one another, after the locking device is activated, the locking position being a normal position for the two stabilizer parts lacking bracing of one against another by the electromechanical actuator.

2. Split motor vehicle stabilizer according to claim 1, wherein the locking device comprises a movable locking bar displaceable in an axial direction and is fixedly attached to the housing in the circumferential direction, and which has at least one form-fit profile, which because of moving the locking bar into the locking position, establishes a form-fit connection with a counter-profile attached to the rotor, having a locking effect in the circumferential direction.

3. Split motor vehicle stabilizer according to claim 1, wherein the locking device includes an electromagnet for holding the locking bar against a pretensioning force of a spring in a nonlocking position.

4. Split motor vehicle stabilizer according to claim 1, wherein the locking device comprises at least three form-fit profiles, a first one of the profiles having a counter-profile provided on the gear unit output shaft, a second one of the profiles having a counter-profile provided on the rotor, and a third one of the profiles having a counter-profile provided on the housing.

5. Split motor vehicle stabilizer according to claim 1, wherein the locking device comprises at least three form-fit profiles, a first one of the profiles having a counter-profile provided in an annular gear of a harmonic drive gear unit, a second one of the profiles having a counter-profile provided on the rotor, and a third one of the profiles having a counter-profile provided on the housing.

6. Split motor vehicle stabilizer according to claim 4, wherein one of the at least three form-fit profiles is always engaged with its counter-profile for fixing the locking bar in the circumferential direction and for axial guiding thereof.

7. Split motor vehicle stabilizer according to claim 4, wherein at least two of the form-fit profiles are engaged with their counter-profiles only when the locking device fixes the two stabilizer parts in the locking position.

8. Split motor vehicle stabilizer according to claim 5, wherein one of the at least three form-fit profiles is always engaged with its counter-profile for fixing the locking bar in the circumferential direction and for axial guiding thereof.

9. Split motor vehicle stabilizer according to claim 5, wherein at least two of the form-fit profiles are engaged with their counter-profiles only when the locking device fixes the two stabilizer parts in the locking position.

10. A method for roll control of an axle of a motor vehicle using a split stabilizer, comprising the acts of:

compensating for roll motions of a vehicle bodywork, with an electromechanical actuator, with respect to a chassis, by bracing two stabilizer parts of the split stabilizer against one another in both rotational directions of the electromechanical actuator to maintain the vehicle bodywork in a substantially parallel horizontal plane; and following one of shutoff and failure of the electromechanical actuator, influencing roll motions of the vehicle bodywork with respect to the chassis by locking a housing of the electromechanical actuator, connected to one of the two stabilizer parts to an electric motor rotor of the electromechanical actuator, connected to the other stabilizer part, with a locking device in a locking position.

11. The method according to claim 10, further comprising placing the locking device in the locking position by displacing a locking bar attached to the housing of the actuator and having at least one form fit profile against a counter profile attached the rotor, to obtain a form fit connection therebetween having a circumferential locking effect.

12. The method according to claim 10, further comprising holding a locking bar of the actuator in non-locking position with an electromagnet.

13. The method according to claim 10, further comprising connecting the two stabilizer parts to one another by arranging profiles thereof in engagement with corresponding counter-profiles thereof.

14. The method according to claim 13, further comprising engaging the profiles with counter-profiles provided on at least one of a gear unit output shaft, on the rotor and on the housing of the actuator.

15. The method according to claim 10, further comprising engaging the profiles with counter-profiles provided on at least one of an annular gear of an harmonic drive gear unit, on the rotor and on the housing of the actuator.

* * * * *